INVENTOR.
CHARLES J. STALEGO
BY
ATTORNEYS

June 21, 1966  C. J. STALEGO  3,257,181
METHOD AND APPARATUS FOR PROCESSING HEAT-SOFTENABLE MATERIALS
Original Filed Nov. 6, 1961  2 Sheets-Sheet 2
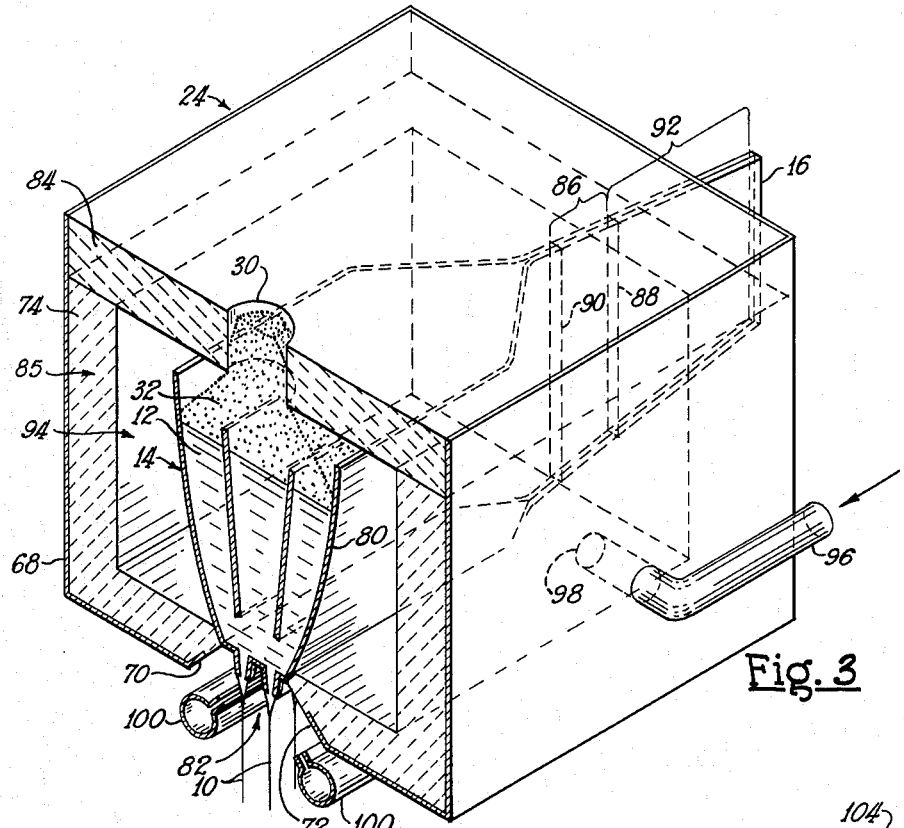
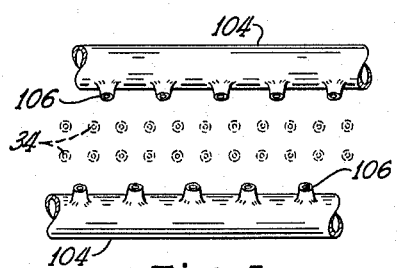
Fig. 5
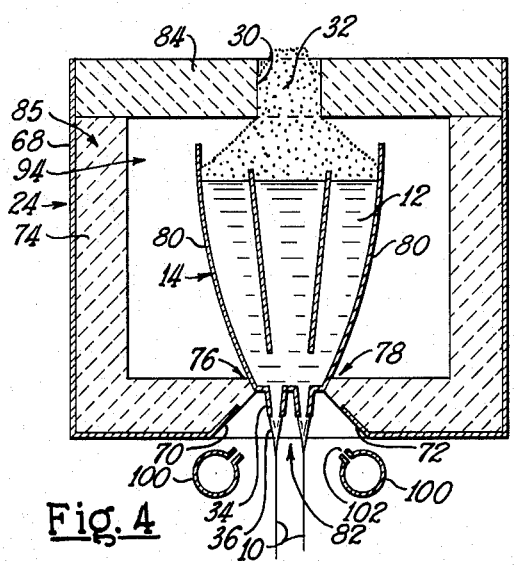
Fig. 4
INVENTOR.
CHARLES J. STALEGO
BY
ATTORNEYS United States Patent Office 3,257,181
Patented June 21, 1966

3,257,181
METHOD AND APPARATUS FOR PROCESSING
HEAT-SOFTENABLE MATERIALS
Charles J. Stalego, Newark, Ohio, assignor to Owens-Corning Fiberglas Corporation, a corporation of Delaware
Continuation of application Ser. No. 150,510, Nov. 6, 1961. This application Feb. 26, 1965, Ser. No. 439,513
4 Claims. (Cl. 65—2)

This is a continuation of application Serial Number 150,510 filed November 6, 1961, now abandoned.

This invention relates to a method and apparatus for melting heat-softenable materials, and more particularly to a method and apparatus for melting high temperature mineral materials, such as glasses, and forming such materials into continuous fibers, utilizing oxidizable refractory metals.

In the prior art, the production of continuous fibers of glass and related silicious materials has been effected by utilizing melter-feeders or bushings of corrosion and heat-resistant metals such as platinum and certain of its alloys.

Melter-feeders made of refractory materials such as clay have heretofore been tried for the production of continuous fibers, however, without apparent success. It is a problem of these refractory materials that they are subject to erosion by the molten glass and release infusible particles into the melt. Since continuous fibers are produced by rapidly attenuating or drawing out very small streams of molten glass to extremely fine diameters on the order of a few microns, the slightest foreign particle may interrupt the process by causing a break in the fiber formation. Since substantially continuous attenuation is required for profitable operations, it will be obvious that such interruptions cannot be tolerated. Therefore, even though platinum and its alloys are much more expensive than the refractory materials, they have provided a sufficiently continuous production operation to justify the high cost.

While platinum has proved satisfactory, however, its melting point of 3192° F. has placed a rather severe upper limit on the softening point of fibers that can be produced by its use. Thus, the fiber softening point must be maintained sufficiently below the melting point of the bushing to prevent destruction of the bushing by melting, and this has been at the general level of about 2200° F.

Other metals such as molybdenum, tungsten and tantalum are available which have substantially higher melting points than platinum. Thus, tungsten has a melting point of 6200° F. and molybdenum and tantalum have melting points of about 5500° F. in contrast to the much lower melting point of 3192° F. of platinum.

However, it is a characteristic of the refractory metals that even though they will withstand these temperatures, they are very highly oxidizable above a threshold temperature of about 400° F. Accordingly, melters made of these refractory metals require special operating techniques wherein they are protected from oxidation by being excluded from contact with the atmosphere.

It is accordingly an important object of the present invention to provide a method and apparatus for melting high temperature heat-softenable materials utilizing melters made of oxidizable refractory metals.

A further object is to provide a method for producing continuous fibers from high temperature melting materials utilizing a bushing made of an oxidizable refractory metal.

A still further object is to provide apparatus for producing continuous fibers from high temperature melting materials, comprising in combination a bushing made of an oxidizable refractory metal.

A still further object is to provide a method for melting heat-softenable materials such as glass, utilizing a melter made of an oxidizable refractory metal wherein inert gas surrounds the melter in oxygen-excluding relation.

A more specific object is to provide apparatus for melting heat-softenable materials, including an electrically heated melter made of oxidation-prone refractory metal, that is prevented from oxidizing by surrounding the body of the bushing with a first gas stream or mantle and surrounding the tip section of the bushing with a second gas stream or mantle in a manner to prevent fiber burn-off.

A further specific object is to provide a method for producing continuous fibers from heat-softenable materials utilizing a fiber-forming bushing made of oxidation-prone refractory metal wherein one gas stream or mantle protects the bushing body from oxidation and a separate gas stream or mantle, isolated from the first gas stream, protects the fiber-forming tip section to prevent fiber burnoff.

Another object is to provide apparatus for producing fibers from heat-softenable materials including an electrically heated fiber-forming bushing of oxidizable refractory metal that is cradled within the refractory support and is prevented from oxidizing by an inert gas surrounding the body of the bushing, with the tip section isolated from the body by the refractory, and the tip section being protected by a second gas stream to prevent fiber burn-off.

In the drawings:

FIGURE 3 is an isometric view, with parts in section, illustrating the present invention;

FIGURE 4 is a transverse sectional view of apparatus embodied in the invention; and FIGURE 5 is a bottom plan view of an alternate embodiment of the gas manifolds for the bushing tip section.

Figures 1, 2:
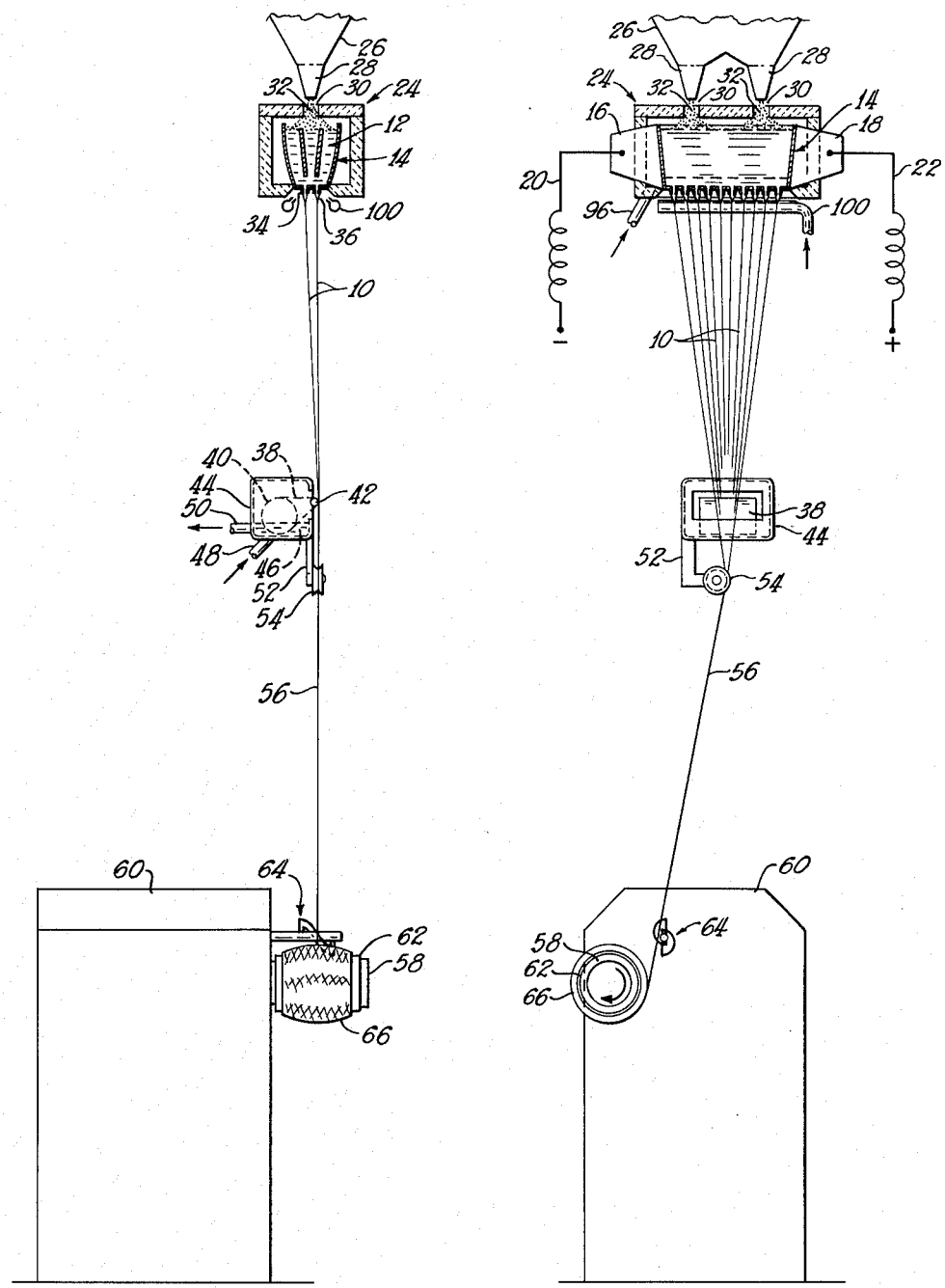
FIGURE 1 is a side view, partly in section, of apparatus used for the production of continuous glass fibers; incorporating the present invention for melting the glass.
FIGURE 2 is a front view, also partly in section, of the apparatus of FIGURE 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

*Perspective view*

Briefly, the present invention relates to a method and apparatus for melting heat-softenable materials and particularly high temperature heat-softenable mineral materials such as high temperature softening glasses, and forming fibers from such materials wherein a high temperature resistant but readily oxidizable refractory melter-feeder is utilized. Thus, melting temperatures substantially higher than those now capable of being produced by melter-feeders made of platinum are provided. In accordance with the present invention the melter is made of very high melting refractory metal and is protected from contact with oxygen and thus against oxidation by having the body of this melter positioned in a cavity filled with inert gas. Also, to prevent the extremely hot gases produced by the body from contacting the fibers and causing burn-off, the body-protecting gas is isolated from the tip section where the fibers are formed, and a second and cooler gas mantle or shroud is formed around the tip section and thus the tip section is also protected from oxidation without danger of fiber burn-off.

These brief aspects of the invention will now be more fully explained by reference to the following description.

The environment

As shown in FIGURES 1 and 2, continuous glass fibers 10 are formed from a molten body of glass 12 that is produced within a melter-feeder 14 which, in accordance with the present invention, is made of an oxidation-prone refractory metal such as tungsten, molybdenum or tantalum. The melter-feeder or bushing 14 is provided with electrical terminals 16 and 18 at each end, FIGURE 2, and electric lines 20 and 22 are respectively connected to the terminals so that electric current can be passed through the bushing to provide extremely high temperatures for producing the molten body 12.

The melter-feeder 14 is housed within a hollow refractory casing 24 and above the casing there is positioned a hopper 26 having feeding funnels 28 spaced along the bottom thereof. The top of the refractory casing 24 is provided with spaced apertures 30, with which the feeding funnels 28 are aligned, and thus powdered materials from the hopper 26 are directed through the casing and into the bushing 14 for melting.

In the bushing 14, glass-forming materials 32 from the hopper 26 are melted to form the molten body 12 and molten glass therefrom exudes downwardly through apertures 34, formed in suitably aligned array along the bottom of the bushing 14, as small streams 36. The streams 36 are attenuated or reduced in diameter and elongated into the fibers 10 and these are passed into tangential contact with a sizing belt 38 operating over a roll 40 and a guide 42. The roll 40 is positioned with a container 44 that contains a liquid body of size 46, with the bottom portion of the roll being immersed in the liquid size; thus, as the belt 38 passes over the roll it is wetted to transfer the size to the fibers during their tangential passage over the guide 42. A conduit 48 supplies fresh size to the container 44 and an exhaust conduit 50 returns the size to a central source for recirculation and enrichment to assure a fresh supply.

A depending arm 52, attached to the size container 44, supports a gathering guide 54 that takes the form of a small wheel having a V-shaped groove in the periphery and that is made of a wear-resistant material. A wheel form is used in the guide 54 so that as wear develops, the wheel can be indexed to bring a new gathering surface into position. After the fibers 10 pick up a coating of size by contact with the wetted belt 38 at the guide 42, they are converged into a strand 56 by the V-periphery of the gathering guide 54.

The strand 56 is then passed downwardly to a cylindrical collet 58 that is adapted to be rotated by a motor (not shown) contained within the cabinet 60. The collet 58 carries a tube 62 upon which the strand 56 is wound, being directed back and forth over the surface of the tube as it is rotated on the collet by a traverser 64 to form a package 66. Rotation of the collet 58 and the tube 62 to wind the strand 56 provides the attenuating force by which the small streams 36 are drawn out into the extremely fine fibers 10.

Movement of the strands 56 in a to-and-fro manner across the surface of the tube 62 by the traverser 66 provides point contact between successive turns of the strand and thereby prevents sticking of the turns to one another when the liquid binder and size is dried.

The invention

As previously mentioned, it is important that the bushing 14, being made of high temperature resistant but readily oxidizable refractory metal, be protected from oxidation. This is accomplished in accordance with the present invention by surrounding substantially all surfaces of the bushing 14, with the exception of the terminals 16 and 18, with an inert gas in a unique manner. Small portions of the terminals 16 and 18 are covered by the surrounding refractory 24 and thus are protected against oxidation, and the exposed end portions of the terminals are protected from oxidation by terminal clamps which are pressed thereagainst in oxygen-excluding relationship. The clamps are cooled to prevent melting and thus keep the temperature of the exposed portions of the terminals below the oxidation threshold.

Accordingly, the hollow refractory casing 24, referred to in the description relating to FIGURES 1 and 2 of the drawings, is provided in surrounding relationship to the body of the bushing 14, with the exception of the bottom or tip section thereof. This is best shown by reference to FIGURES 3 and 4 of the drawings wherein the refractory casing indicated generally by the numeral and arrow 24 is shown in greater detail. Thus, the casing 24 includes a box-like shell or support 68 that is suitably made of stainless steel, cold rolled steel, platinum or the like, depending upon the thickness of the refractory contained therein to protect it from the heat of the bushing 14. The shell 68 is generally continuous except that at the ends it is provided with openings permitting passage of the terminals 16 and 18; also at the bottom, as shown in FIGURES 3 and 4, it is provided with an elongated opening defined by upwardly angled lips 70 and 72.

Interiorly, the shell 68 is provided with a lining 74 of refractory material. This may take the form of zirconia and thoria for extremely high temperatures or magnesia, alumina or titania for lower temperatures. In addition to protecting the support sheet 68, the refractory lining 74 is provided for the purpose of retaining the heat of the bushing to provide more efficient melting, and as will be subsequently described, provides a space enclosing the bushing that is adapted to retain an inert gas in protective relationship to the walls of the bushing.

The refractory centrally of the bottom of the casing 24 tapers upwardly, being supported by the upwardly angled lips 70 and 72 to provide support ledges 76 and 78 extending longitudinally of the bushing at the base of the side walls 80, just above the tip section 82. It will be noted that the upwardly angled lips 70 and 72 of the metal casing 68 do not contact the bushing; thus electrical isolation is maintained. In a similar manner, the terminals 16 and 18 of the bushing are electrically isolated from the metal shell 68 by a narrow gap filled with refractory 74 to prevent shorting around the bushing 14, and therefore assure electrical conductance through the bushing for heating.

The top of the hollow refractory casing 24 takes the form of a rectangular plate of refractory 84 that, as previously described, is provided with spaced holes 30 located centrally above the top of the bushing 14 so that powdered materials 32 can be fed therethrough into the bushing for melting. The casing 74 surrounds the bushing 14 in gas-tight relationship and accordingly all joints such as that between the top plate 84 and the side wall 85 and at the support ledges 76 and 78 are gas-tight. Also, as will be noted in FIGURE 3, the terminal 16 or 18 extends through the end wall of the refractory casing 24, with the portion 86 thereof being encased within refractory 74 between the outer refractory limit 88 and the inner refractory limit 90, the refractory surrounding the portion 86 of the terminal in gas-tight relationship. The short portion 92 of the terminal 16 or 18 lies exteriorly of the casing 24 to provide for the connection of a terminal clamp to supply electric current in accordance with the illustration of FIGURE 2. Due to the cooling of the terminal clamp and its generally surrounding relationship to the portion 92, oxidation is substantially eliminated.

Thus, the main body portion of the bushing 14, defined by the upstanding walls 80, is generally surrounded by the casing 24 in spaced relation so as to provide a first gas zone or chamber 94. This chamber 94 is adapted to be filled with an inert gas by means of a conduit 96, FIG- URE 3, extended in gas-sealed relationship through an aperture 98 in the side wall of the casing 24, to form a protective mantle around the wall 80. As best shown in FIGURE 4, the top 84 of the casing 24 is positioned a short distance above the upper edge of the bushing to allow passage of protective gas in surrounding relationship to the exterior and interior of the bushing.

When using powdered batch or ground cullet as feed stock, the openings 30 in the top cover 84 of the casing 24 can be left open and a constant feed of material provided so that the incoming material builds up through the feed holes 30, filling them, to act as a porous plug at these openings. Thus, the body of the bushing is completely protected by inert gas from oxidation.

As previously mentioned, the inert gas surrounding the side walls 80 of the bushing 14 will become heated to extremely high temperatures during operation of the bushing. If these gases were permitted to pass downwardly at the support ledges 76 and 78 to protect the tip section of the bushing from oxidation, they would be so hot that they would cause the fibers 10 to be melted or burned off. Accordingly, a gas seal is provided along support ledges 76 and 78 and a second gas envelope or mantle is utilized in accordance with the invention to protect the tip section 82 of the bushing 14 against destructive oxidation; the second mantle is thus retained at a temperature below that of the side wall 80 and also is below the temperature of the feed orifice as well as the molten material issuing through the feed orifice and the softening point of the fiber produced therefrom.

The second gas mantle is provided through the use of a pair of manifolds 100 that are positioned below and to each side of the tip section 82 to clear the downcoming fibers 10. As shown in the embodiment of the invention represented by FIGURES 3 and 4, each of the manifolds 100 is provided with a slot 102 extending the length of the tip section and the slots are turned upwardly toward the tip section to direct gas from the interior of each manifold 100 up into surrounding, protecting relationship to the orifices 34 of the tip section.

As shown in FIGURE 5, a different manifold arrangement can be utilized within the scope of the invention. In this embodiment, the manifold bodies are designated as 104 and these are provided with spaced orifices 106 which may be staggered as shown in FIGURE 5, or they may be opposed.

*Operation*

From the foregoing, it will be understood that when electric current is passed through the bushing 14 by means of terminals 16 and 18 and electric lines 20 and 22, the bushing will be heated to an extremely high temperature to melt the glass forming materials 32, fed thereinto. This temperature, of course, is substantially above the threshold oxidation temperature of about 400° F. of the metals tungsten, tantalum and molybdenum as previously described for fabricating the bushing, and unless suitably protected from the atmosphere and its oxidizing gases, will be quickly deteriorated and rendered inoperable. Therefore, to avoid deterioration and provide long operating life in accordance with the present invention, an inert gas is fed into surrounding relationship with the walls 80 of the bushing 14 through the conduit 96 and into the space 94 provided by the casing 24, the batch material or cullet built up through the feed holes 30 acting as a porous plug at these openings. A sufficient gas pressure is provided to provide a very slight positive pressure within the gas zone 94 and thus prevent entry of oxygen from the atmosphere into the chamber 94.

Simultaneously with the heat-up of the bushing, gas is introduced through the manifolds 100 or 104 to gently flow upwardly and around the tip section 82 to provide a protective mantle. By virtue of a seal at support ledges 76 and 78 the hot gas produced by contact of the gas environment in zone 94 with the side walls 80 of the bushing 14 is prevented from issuing downwardly to the tip section to cause burn-off of the fibers 10.

The manifolds 100 not only provide a protecting gas environment, but the gas environment so provided is cooler, thus facilitating fiber formation.

*Alternate charging of the melter*

Although not illustrated in the drawings, it is to be considered within the scope of the invention to feed glass marbles or small glass pellets to the bushing 14 for melting therein instead of the powdered batch materials or powdered glass pellets shown. When so operating, a plug is normally positioned in the feed holes 30, to be removed when materials are intermittently fed through the bushing for melting. Of course, powdered batch or ground cullet can also be fed in this manner if desired. The plug so used can be either porous or non-porous. A porous plug will provide gas seepage through the pores. When a non-porous plug is used, gas seepage around the plug provides gas circulation to provide assurance that no air will enter the chamber 94.

*Protection of the tip section*

As shown in FIGURE 4, the bottoms of the tips 34 of the bushing 14 are preferably recessed slightly upwardly into the case 24. Thus, in one example the bottoms of the tips would be about ¼ inch above the bottom of the case. This provides a shallow pocket for retaining a lighter-than-air gas such as helium to exclude air and thus provide assurance that the tips are retained in a non-oxidizing environment.

*Extended scope of invention*

The metals particularly contemplated for the bushings to be used in producing fibers in accordance with the present invention include tungsten, molybdenum, tantalum and alloys thereof. Tungsten has a melting point of 6200° F. and molybdenum and tantalum each have melting points of about 5500° F. Thus, it is within the scope of the invention to utilize these metals for producing fibers having melting temperatures extending as high as 4500° F., thus allowing a safe margin to prevent destruction of the bushing by melting. In some instances, by exercising a sufficient degree of caution, temperatures above this level can be approached for producing fibers from silicous mineral materials of even higher melting points.

In addition to the pure metals, alloys of these materials can be used as follows:

| | Melting Temp. °F. |
|---|---|
| Tungsten and molybdenum— all proportions | 5500–6200 |
| Tungsten and tantalum—all proportions | 5500–6200 |
| Molybdenum and tantalum—all proportions | 5500 |

Although the invention has been described with particular emphasis on the oxidizable refractory metals, it is to be considered within the broadened scope of the disclosure to fabricate the melter of metals of lower melting points which are also oxidation prone and accordingly require protection for operation at elevated temperatures. When so operating, materials having softening temperatures compatible with the metals employed will be used.

The inert gases which can be employed in accordance with the present invention would include nitrogen, helium, argon, neon and the like which will not react with the metal of the bushing. As mentioned, a lighter-than-air gas is preferred at the tip section so that the gas will move upwardly around the tips and displace the gases of the surrounding ambient atmosphere.

Although the foregoing disclosure has been directed particularly to the concept of forming fibers from high-melting mineral materials such as glass, it is to be understood that substantially any heat-softenable material can be melted and processed by the present concept. Thus, resinous organic materials of both the natural and synthetic variety can be melted for processing and those materials having requisite properties can be made into fibers.

*Summary and advantages*

The present invention thus provides a method and apparatus for melting a broad range of heat-softenable materials, being particularly applicable to high temperature heat-softenable materials such as high melting glasses, and producing fibers from such materials that have substantially higher softening points than those now capable of being produced by melters and bushings made of platinum and its alloys. In the past, an upper level of about 2200° F. has been imposed by the metals used. However, by the present invention, fibers having softening points extending upwardly to the range of about 4500° F. can be produced. Generally it can be stated that these higher melting glasses contain as principal ingredients such high melting materials as zirconia ($ZrO_2$) and thoria ($ThO_2$).

It is an advantage of the invention that oxidation-prone metals in general can be utilized for melting and processing heat-softenable materials and producing fibers.

Among the other advantages which arise from the present invention, there is included the fact that a method and apparatus are provided for melting heat-softenable materials wherein melting efficiencies are extremely high. Thus, the gas surrounding the bushing in the relatively quiescent zone provided, along with the supporting refractory, provides excellent insulation for retention of heat in the melting zone. Thus, greatest use of electrical energy is assured. Also, by effecting a very slow seepage of gas into and out of protecting relationship with the bushing, it is possible to utilize relatively expensive gases due to the extremely conservative and efficient manner in which they are retained without loss within the sealed space 94.

Further, fiber forming is improved by the cooling effect of the lower manifold and fiber burn-off is substantially eliminated by isolation of the heat from the main body of the bushing and by preventing hot gas from the bushing wall from contacting the fibers after formation.

I claim:
1. In apparatus for processing heat-softenable materials to form fibers,
a melter made of oxidizable metal,
heating means for heating said melter to melt materials placed therein,
said melter having an upstanding wall and a bottom connected to the bottom edge of said wall, and a discharge nozzle in said bottom, extending below the bottom edge of said wall and exposed to ambient atmosphere,
a substantially closed, temperature-resistant casing supporting said wall along the bottom edge and forming a gas chamber in spaced, surrounding relation to said wall, and positioned above said discharge orifice,
first means for supplying inert gas to said chamber,
said bottom edge of said wall being sealed to the bottommost portion of said casing,
and second means for directing inert gas into surrounding relation with said discharge nozzle at a temperature less than said nozzle,
whereby radiation from said wall and gas contacting said wall and becoming heated thereby is prevented from contacting fibers drawn from said discharge orifice and thus prevented from burning off fibers so formed.

2. In apparatus for producing glass fibers,
a melter of refractory metal,
heating means for heating said melter to melt glass materials placed therein,
said melter being of U-shaped cross section and including spaced sides joined along the lower edges by a transversely extending bottom, a feed orifice in said bottom extending away from said sides, and the melter having an open top,
a refractory casing surrounding said sides in spaced relation,
an opening in said refractory casing receiving said bottom, and said casing around said opening cradling said sides adjacent to said bottom, and being in sealed contact with said sides, and with said feed orifice extending into said opening and directly exposed to the ambient atmosphere on the outside of said casing,
a feed opening in said refractory casing for feeding glass materials into the open top of said melter,
means for introducing inert gas into the interior of said refractory casing to surround said melter,
means closing said feed opening to limit escape of gas therefrom,
and a manifold on the outside of said refractory casing having a nozzle positioned adjacent to said feed orifice to direct a stream of inert gas into surrounding relationship to said feed orifice,
whereby hot gases produced within said casing by contact with said sides of said melter are isolated from said feed orifice to prevent burn-off of fibers produced from the feed orifice, and radiation produced by said sides of said melter is also isolated from contact with said feed orifice to prevent fiber burn-off.

3. The invention of claim 2 wherein the portion of said refractory casing surrounding said opening receiving said bottom of said melter is of sufficient dimension to provide a pocket within which said feed orifice is positioned, and into which gas from said nozzle of said manifold is directed to surround said feed orifice.

4. In a method of producing fibers of heat-softenable materials by operating a melter of oxidizable metal, the melter having an upstanding wall and an open top, and a bottom attached to the lower edge of the wall, with a feed orifice in the bottom and the feed orifice exposed to the ambient atmosphere,
the steps of
filling the melter with heat-softenable material,
surrounding the wall with a first inert gas mantle,
heating the wall to a temperature sufficient to melt heat-softenable material to exude through the feed orifice in the bottom,
retaining the first inert gas mantle around the wall and out of contact with the feed orifice and the material exuding therefrom,
blocking radiation between said wall and said feed orifice,
surrounding the feed orifice with a second, unrestrained, inert gas mantle,
and maintaining the temperature of the second inert gas mantle at a temperature less than the temperature of said wall and the material exuding from said feed orifice by directing a stream of relatively cool inert gas upon said wall and said orifice.

References Cited by the Examiner

UNITED STATES PATENTS

| 2,303,657 | 12/1942 | Parsons | 65—16 |
| 2,908,036 | 10/1959 | Russell | 65—12 |
| 3,056,846 | 10/1962 | Glaser | 65—2 |
| 3,066,504 | 12/1962 | Hartwig et al. | 65—32 |
| 3,109,045 | 10/1963 | Silverman | 13—6 |
| 3,150,225 | 9/1964 | Sens | 13—6 |

FOREIGN PATENTS

| 764,396 | 10/1952 | Germany. |
| 876,012 | 8/1961 | Great Britain. |

DONALL H. SYLVESTER, *Primary Examiner.*

R. L. LINDSAY, *Assistant Examiner.*